Oct. 24, 1933.  A. B. WELTY  1,932,096
GRAIN WHEEL FOR HARVESTER THRESHERS
Filed Jan. 30, 1933  2 Sheets-Sheet 1
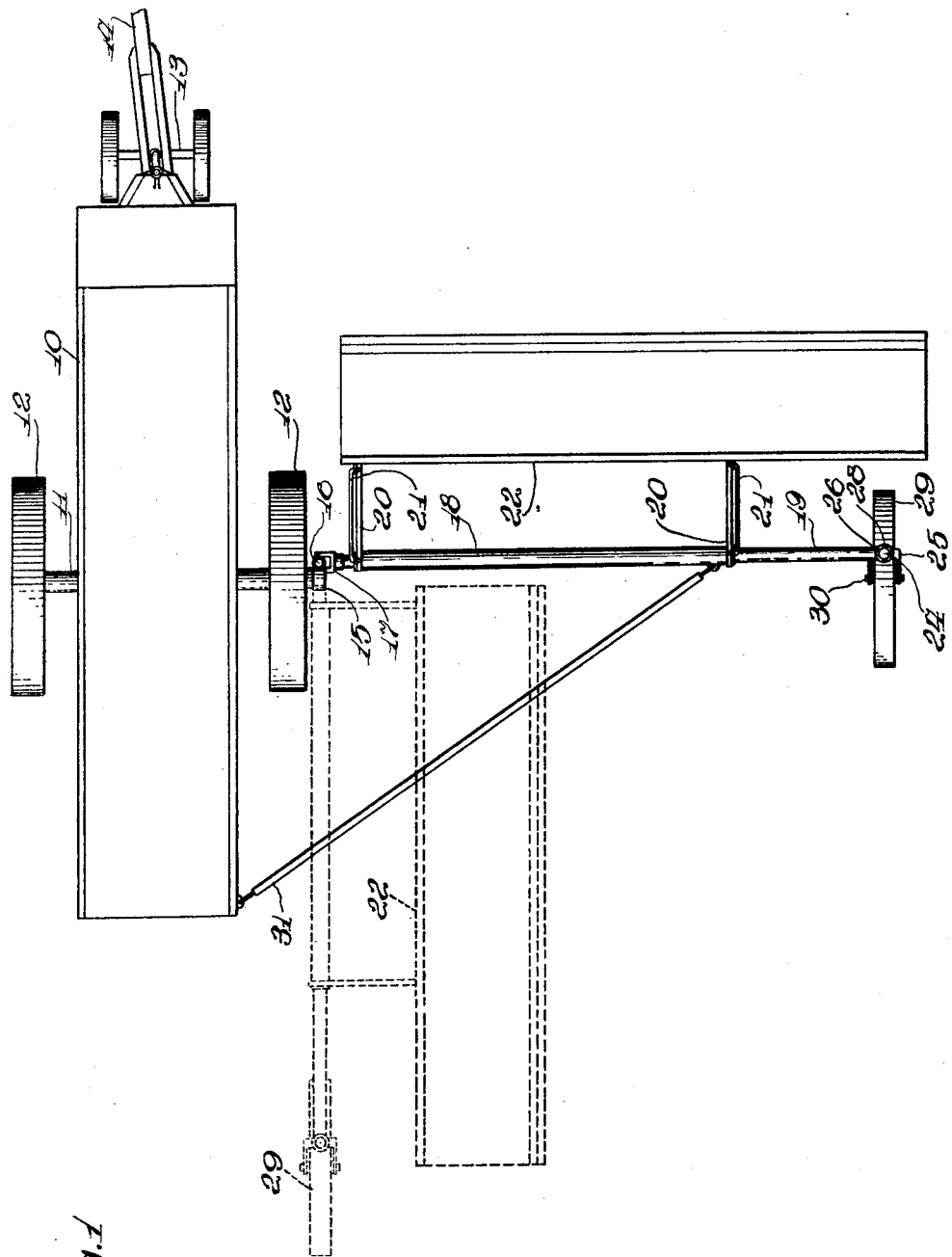

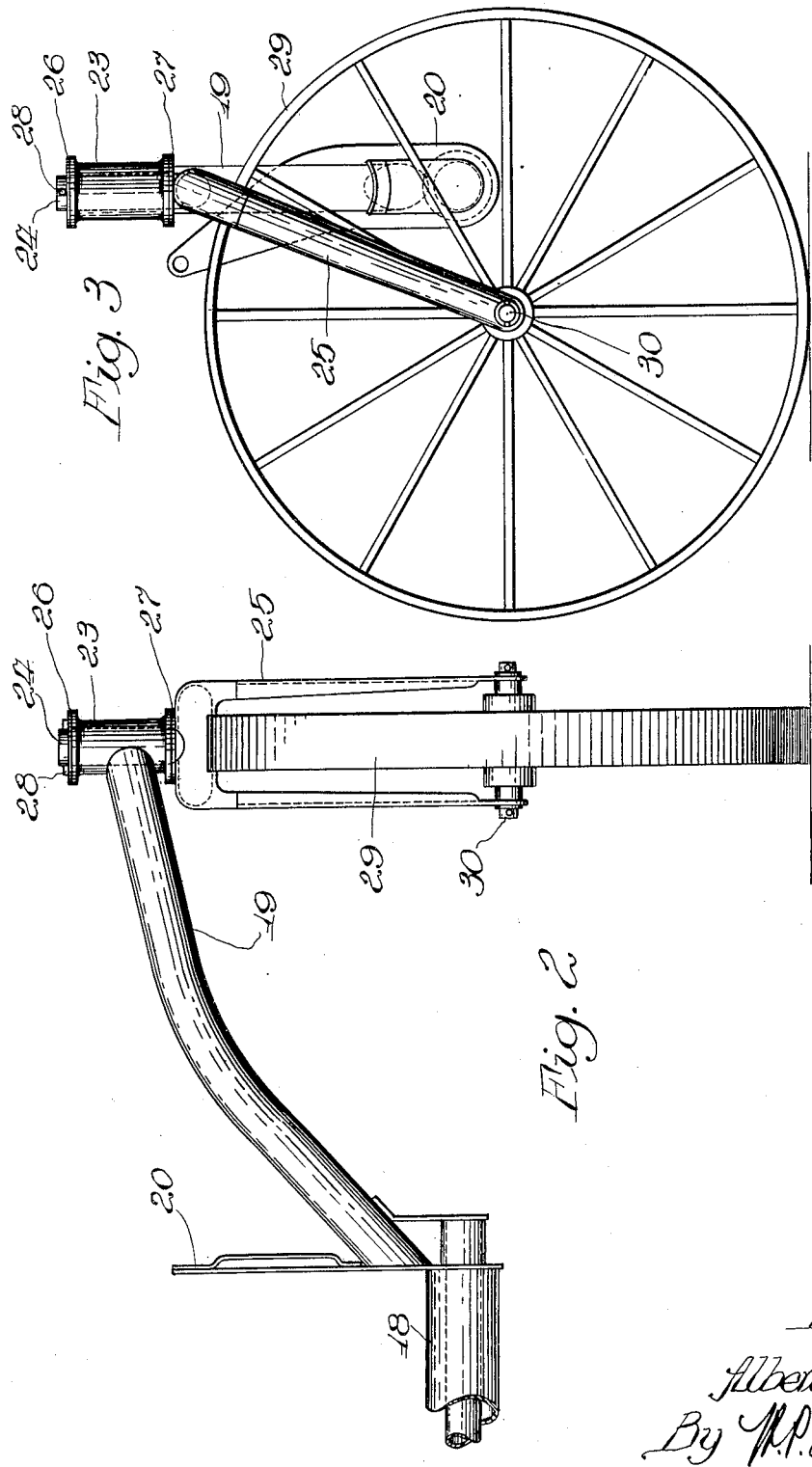

Patented Oct. 24, 1933

1,932,096

UNITED STATES PATENT OFFICE 1,932,096

GRAIN WHEEL FOR HARVESTER THRESHERS

Albert B. Welty, Kenilworth, Ill., assignor to International Harvester Company, a corporation of New Jersey Application January 30, 1933. Serial No. 654,223

10 Claims. (Cl. 56—322)

This machine relates to harvester threshers and particularly to a combined grain and transport wheel for such machines.

As is well known in the art relating to harvester threshers, these machines usually comprise a rigid main frame carried on an axle and a pair of wheels, which frame supports the grain separating mechanism on the thresher. Laterally offset from the main frame is the harvester part of the machine which includes a supporting axle hingedly and foldingly connected to the main frame or to the axle thereof. This harvester axle is hingedly connected on a longitudinal axis for movement of the harvester in a vertical plane to accommodate the irregularities in the field. Usually the harvester part is also foldably connected to the main frame so that it may be swung back in a horizontal plane for the purpose of narrowing materially the width of the machine so that it may more easily be transported through gateways and along narrow highways.

It is quite common at the present time to provide harvester threshers with the folding feature above referred to. The present invention contemplates an improvement in a thresher of this type, the principal object being to provide a novel grain and transport wheel. Other objects will be apparent from the drawings and the detailed description to follow.

A preferred form of the device in which the invention is embodied and by which the objects of the invention are obtained, are shown in the drawings, in which:

Figure 1 is a plan view showing diagrammatically the essential elements of the frame of the harvester thresher with the harvester part in operative position, the dotted lines showing the harvester part in folded or transport position;

Figure 2 is an enlarged detail in elevation, showing the grain and transport wheel and the means by which it is attached to and supports the outer end of the harvester platform; and Figure 3 is an end elevation of the same elements shown in Figure 2.

Only such parts of a harvester thresher have been illustrated as are necessary to disclose the features of the present invention as such machines and their construction and operation are well known in the prior art.

The harvester thresher, as illustrated, consists of a main frame 10 supported on an axle 11, which is provided with round engaging wheels 12. The forward end of the main frame is provided with a wheeled tongue truck 13 and a draft tongue 14. The tongue truck is pivotally connected to a vertical axis whereby the machine may be steered by changing the angular position of said truck.

At one end the axle 11 extends beyond the supporting wheel 12 at that side of the main frame and is provided with a bracket 15 rigidly secured thereto. A pivot block 16 is secured to said bracket on a substantially vertical axis. A coupling member 17 is pivotally secured to the block 16 on a horizontal axis parallel to the line of draft when the harvester part of the machine is in laterally extended or operative position. The harvester part of the machine, which includes the conventional cutting mechanism and the platform for receiving the grain, (these elements not being shown in the drawings,) is supported on an axle 18. Said axle is pivotally secured to the coupling member 17 at one end. Its other end is pivotally secured to an arm 19 which extends upwardly and outwardly to form means for supporting the outer end of the harvester. Supporting members 20 and 21 extend forwardly to support the frame 22 of the harvester platform. As previously mentioned, this construction is well known in the prior art and has not been illustrated in detail.

The arm 19 extends upwardly a substantial distance above the axle 18. It is provided at its upper end with a bearing sleeve 23 which forms a substantially vertical pivot for the standard 24 of a yoke 25. The sleeve 23 is flanged at its ends to form horizontal bearing surfaces for bearing collars 26 and 27 which are mounted on the standard 24 respectively above and below the sleeve. The lower collar 27 abuts the upper portion of the yoke 25. It is at this point of contact that the weight of the harvester is carried on the yoke 25. A cotter pin 28 extends through the standard 24 above the upper collar 26 whereby the standard is held against vertical movement with respect to the sleeve 23 while being free to rotate with respect thereto.

The yoke 25 is offset rearwardly from its pivot axis on the standard 24, as illustrated in Figure 3. The arms of the yoke are of considerable length, whereby a comparatively large diameter wheel 29 may be mounted in the yoke. A short shaft 30, extending through aligned openings in the arms of the yoke 25, provides an axle for the wheel 29. It will be noted that although the yoke is slanted somewhat away from the vertical position, the axis of the wheel is not far removed from the axis of the main axle 18 which carries the harvesting part of the machine.

A brace bar 31 removably connected to the rear of the main frame 10, extends diagonally forward and is removably connected to the outer end of the axle 18.

The purpose of the grain and transport wheel 29, as above described, is well known to those skilled in the art. Said wheel supports the outer end of the harvesting part of the machine and must be so constructed that short angled turns of the main frame may be made without dragging or otherwise improper functioning of this wheel. When a sharp turn is made to the left, the grain wheel 29 merely follows around in its normal castering position with the yoke extending rearwardly from the pivot axis of the standard 24, which carries the yoke.

When a sharp turn of the machine is made to the right, which is the usual direction of turning when the machine is in operation, the pivot axis of the whole machine is toward the main frame side of the wheel 29, which necessitates that the grain wheel move rearwardly during the turn. By providing a large diameter wheel on a castering support with the axis of the wheel only a few degrees away from vertical, a construction has been obtained which will freely swing or caster around when backing or short turning to the right brings about movement to the rear of the outer end of the harvesting portion of the machine. The arched arm 19 has been provided to give sufficient clearance for the castering grain wheel to swing around freely to castering position during movement of the machine in any direction.

When the machine is to be transported the brace bar 31 is removed and the harvesting portion of the machine is swung around to a trailing position, as shown in dotted lines in Figure 1. The wheel 29 automatically swings around about its castering axis and becomes a freely castering transport wheel, which is the proper arrangement for such a wheel. In this construction a grain and transport wheel has been provided which is very simple in construction and effective in operation. Moreover there are no adjustments or locks required when shifting the harvesting portion of the machine from one of its positions to the other.

It is to be understood that applicant has shown and described only a preferred construction of his novel grain and transport wheel and that he claims as his invention all modifications falling within the scope of the appended claims.

What is claimed is:

1. In a harvesting machine having a wheel supported main frame and an auxiliary frame structure for the harvester part of the machine pivotally connected to the main frame on a transverse axis and in combination therewith an arched wheel support rigidly secured to the outer end of the frame structure and extending upwardly and outwardly therefrom, and a grain and transport wheel pivotally mounted on said support, said support being arched sufficiently to permit unlimited castering of the wheel.

2. A harvesting machine having a wheel supported main frame and a laterally extending supporting structure for the harvester part of the machine, said structure being pivoted at one end to the main frame on transverse and longitudinal axes, and in combination therewith a grain wheel support rigidly secured to the frame structure at the outer end thereof and extending upwardly and outwardly therefrom, and a grain and transport wheel pivotally mounted on said support for free castering action about a substantially vertical axis.

3. A harvesting machine having a wheel supported main frame and a laterally extending supporting structure for the harvester part of the machine, said structure being pivoted at one end to the main frame on transverse and longitudinal axes, and in combination therewith a grain wheel support rigidly secured to the frame structure at the outer end thereof and extending upwardly and outwardly therefrom, a forked standard pivotally mounted on a substantially vertical axis on said support, and a grain and transport wheel pivotally mounted on a horizontal axis on said standard.

4. A harvesting machine having a wheel supported main frame, an axle for carrying the harvesting part of the machine pivotally connected at one end on transverse and longitudinal axes to the main frame, and in combination therewith a wheel support rigidly secured to the free end of said axle and arched upwardly and outwardly therefrom, and a grain and transport wheel pivotally mounted under said support for castering about a substantially vertical axis, said support being arched sufficiently to permit the grain wheel to caster thereunder.

5. A harvesting machine having a wheel supported main frame, an axle for carrying the harvesting part of the machine pivotally connected at one end on transverse and longitudinal axes to the main frame, and in combination therewith a wheel support rigidly secured to the free end of said axle and arched upwardly and outwardly therefrom, a standard pivotally connected to the end of said wheel support for angular movement about a substantially vertical axis, and a grain and transport wheel pivotally mounted on a horizontal axis on said standard.

6. A harvesting machine having a wheel supported main frame, an axle for carrying the harvesting part of the machine pivotally connected at one end on transverse and longitudinal axes to the main frame, and in combination therewith a wheel support rigidly secured to the free end of said axle and arched upwardly and outwardly therefrom, a standard pivotally connected to the end of said wheel support for angular movement about a substantially vertical axis, and a grain and transport wheel pivotally mounted on a horizontal axis on said standard, the axis of rotation of said wheel being spaced from the axis of the standard whereby the wheel trails in a definite position during movement in any one direction.

7. A harvesting machine having a wheel supported main frame, an axle for carrying the harvesting part of the machine pivotally connected at one end on transverse and longitudinal axes to the main frame, and in combination therewith a wheel support rigidly secured to the free end of said axle and arched upwardly and outwardly therefrom, a standard pivotally connected to the end of said wheel support for angular movement about a substantially vertical axis, and a grain and transport wheel pivotally mounted on a horizontal axis on said standard, the axis of said wheel being substantially in alignment with the axis of the axle which it supports and on which the harvester part of the machine is supported.

8. A harvesting machine having a wheel supported main frame and a harvester part foldingly connected to the main frame about a vertical axis, a wheel support extending outwardly and upwardly beyond the free end of the harvester part, and a grain and transport wheel pivotally mounted on said support, said support being arched to provide clearance for castering action of the grain and transport wheel.

9. In a harvesting machine of the class described a main frame, a harvester part including an axle laterally offset from the main frame and foldingly connected thereto for rearward and horizontal folding, an arm rigidly secured to the free end of the axle and extending upwardly beyond said axle, a yoke pivoted to the outer end of said arm on a vertical axis, a wheel pivoted on a horizontal axis on the offset portion of said yoke, the axis of said wheel being substantially in alignment with the harvester axle, and a brace connected to the main frame and to the harvester part for holding the harvester part in laterally extended position, said brace being removable for swinging the harvester part around to trailing position.

10. In a harvesting machine of the class described a main frame, a harvester part including an axle laterally offset from the main frame and foldingly connected thereto for rearward and horizontal folding, an arm rigidly secured to the free end of the axle and extending upwardly beyond said axle, a yoke pivoted to the outer end of said arm on a substantially vertical axis free to pivot about a vertical axis in any direction, said yoke being offset from its pivot axis, a wheel pivoted on a horizontal axis on the offset portion of said yoke, and a brace connected to the main frame and to the harvester part for holding the harvester part in laterally extended position, said brace being removable for swinging the harvester part around to trailing position.

ALBERT B. WELTY.